United States Patent Office 3,780,109
Patented Dec. 18, 1973

3,780,109
2-ALKYL-3-(2-NORBORNYL)-PROPANALS
Alfred A. Schleppnik, St. Louis, Mo., assignor to
Monsanto Company, St. Louis, Mo.
No Drawing. Filed Jan. 4, 1971, Ser. No. 103,879
Int. Cl. C07c 47/34
U.S. Cl. 260—598
9 Claims

ABSTRACT OF THE DISCLOSURE 2-alkyl-3-(2'-norbornyl)-propanals characterized by the structural formula

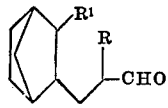

wherein $R^1$ represents hydrogen or methyl, and R represents a lower alkyl group are prepared by a crossed aldol condensation of 5-norbornene-2-carboxaldehyde or norbornane-2-carboxaldehyde with aliphatic aldehyde in a basic medium. The resulting product is dehydrated to form the 2 - alkyl-3-(2'-norborn(en)yl)-prop-2-en-1-als which are subsequently hydrogenated. The compounds have very pleasant, strong and long lasting woody odors and are useful as compounds in fragrance compositions.

This invention relates to the art of fragrance compositions and, more particularly, to a novel class of compounds possessing a characteristic odor. More specifically, this invention is directed to a novel class of useful compounds, their preparation and use of such compounds as fragrances.

The art of perfumery began, perhaps, in the ancient cave dwellings of prehistoric man. From its inception, and until comparatively recently, the perfumer has utilized natural perfume chemicals of animal and vegetable origin. Thus, natural perfume chemicals such as the essential oils, for example, oil of rose and oil of cloves, and animal secretions such as musk, have been manipulated by the perfumer to achieve a variety of fragrances. In more recent years, however, research perfume chemists have developed a large number of synthetic odoriferous chemicals possessing aroma characteristics particularly desired in the art. These synthetic aroma chemicals have added a new dimension to the ancient art of the perfumer, since the compounds prepared are usually of a stable chemical nature, are inexpensive as compared with the natural perfume chemicals and lend themselves more easily to manipulation than natural perfume chemicals since such natural perfume chemicals are usually a complex mixture of substances which defy chemical analysis. In contrast thereto, the synthetic aromatic chemicals possess a known chemical structure and may therefore be manipulated by the perfumer to suit specific needs. Accordingly, there is a great need in the art of fragrance compositions for new compounds possessing specific characteristic aromas.

In accordance with the present invention, there is provided a novel class of 2-alkyl-3-(2'-norbornyl)-propanals. The compounds of this invention are prepared by a crossed aldol condensation of 5-norbornene-2-carboxaldehyde or norbornane-2-carboxaldehyde with aliphatic aldehydes in a basic medium followed by a subsequent dehydration of the aldol formed to the prop-2-en-1-als which are subsequently hydrogenated. The compounds have very pleasant, strong and long lasting woody odors and are useful as compounds in fragrance compositions.

The principal object of the present invention is to provide a new class of aroma chemicals consisting of 2-alkyl-3-(2'-norbornyl)propanals and to methods of preparing them.

Another object of the present invention is to provide a specific class of norbornyl-propanal compounds having a characteristic aroma which is utilized in the preparation of fragrances and fragrance compositions.

These and other objects, aspects and advantages of this invention will become apparent from a consideration of the accompanying specification and claims.

In accordance with the above objects, there is provided by the present invention a novel class of compounds characterized by the structural formula

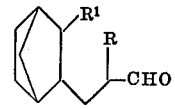

wherein $R^1$ represents hydrogen or methyl, and R represents a lower alkyl group, i.e., an alkyl group of from 1 to 8 carbon atoms.

Representative alkyl groups characterized by R in the above formula include methyl, ethyl, n-propyl, i-propyl, n-butyl, i-butyl, tert-butyl, n-amyl, i-amyl, tert-amyl, n-octyl and the like.

The novel compounds of this invention are prepared by reacting a 5-norbornene-2-carboxaldehyde or norbornane-2-carboxaldehyde with an aliphatic aldehyde possessing an alpha methylene group and characterized by the structural formula

wherein R is lower alkyl of from 1 to 8 carbon atoms, in a basic medium followed by a dehydration of the aldol formed. The resulting 2-alkyl-3-(2'-norborn(en)yl)-prop-2-en-1-als are then hydrogenated to the 2-alkyl-3-(2'-norbornyl)-propanals.

The aliphatic aldehydes described above include compounds such as propanal, butyraldehyde, valeraldehyde, isovaleraldehyde, hexaldehyde, heptaldehyde, and the like.

In a preferred embodiment of this invention, 5-norbornene-2-carboxaldehyde is reacted with propanal in the presence of a strong base such as sodium hydroxide and the like. Alternatively, a strong basic ion exchange resin may be used in lieu of the strong base.

Ordinarily the mixture of the norbornene or norbornane carboxaldehyde and the aliphatic aldehyde is refluxed for varying lengths of time to afford the products of this invention. The reaction is preferably carried out in the presence of water and lower alkanols.

The norbornene or norbornane carboxaldehydes and the aliphatic aldehydes which are reacted in accordance with this invention are preferably reacted in a mole ratio from about 1 to 2, however, the mole ratio may be from about 2:1 to about 1:5 and still be satisfactory.

The reaction conditions are not critical but should be such as to facilitate the preparation of the products. Thus, the reaction is normally conducted at a temperature of from ambient temperatures up to about 150° C.

The novel compounds of this invention are useful in the preparation and formulation of fragrance compositions such as perfumes and perfumed products due to their pleasing, strong and long lasting aroma. Perfume compositions and the use thereof in cosmetic, detergent and bar soap formulations and the like are exemplary of the utility thereof.

The compounds of this invention are used in concentrations of from trace amounts up to about 50 percent of the perfume composition into which they are incorporated. As will be expected, the concentration will vary depending on the particular fragrance composition and even within the same compositions when compounded by different perfumers.

EXAMPLE 1

2-methyl-3-(2'-norborn-5'-en-yl)-prop-2-en-1-al

To a refluxing solution of 61.5 g. (0.5 mole) 5-norbornene-2-carboxaldehyde in 100 ml. methanol, containing 3 ml. of a 40% sodium hydroxide solution was added, with stirring, 58 g. (1 mole) of propanal over a period of one hour. Refluxing was continued for one hour and the reaction mass was then diluted with 500 ml. cold water. The organic layer, a heavy orange colored oil, was separated. The aqueous phase was extracted with ether and the extract was combined with the oil and washed consecutively with water, dilute hydrochloric acid, water and concentrated brine and was then dried over sodium sulfate. The oil was distilled through a short Vigreux column to give 2-methyl-3-(2'-norborn-5-en-yl)-2-propen-1-al which had a boiling point of 108–112° C. at 12 mm. Hg and a $n_D^{25}=1.5214$.

EXAMPLE 2

2-methyl-3-(2'-norbornyl)-propanal

A solution of 32.4 g. (0.2 mole) of the 2-methyl-3-(2'-norborn-5'-en-yl)-prop-2-en-1-al, prepared by the procedure of Example 1, in 100 ml. of ethanol is hydrogenated over 1 g. 5% palladium on charcoal at 5 p.s.i. and room temperature to give 20.3 g. of 2-methyl-3-(2'-norbornyl)-propanol which had a boiling point of 96° C. at 8 mm. Hg and a $n_D^{25}=1.4738$.

EXAMPLE 3

2-n-butyl-3-(2'-norbornyl)-propanal

Following the general procedure of Example 1, 5-norbornene-2-carboxaldehyde was reacted with n-hexaldehyde to give 2-n-butyl-3-(2'-norborn-5'-en-yl)-prop-2-en-1-al which had a boiling point of 129–133° C. at 10 mm. Hg and a $n_D^{25}=1.5040$. This product was hydrogenated following the general procedure of Example 2 resulting in the formation of 2-n-butyl-3-(2'-norbornyl)-propanal.

While this invention has been described hereinabove with regard to certain illustrative specific embodiments, it is not so limited since many modifications and variations are possible in the light of the above teachings. It is understood therefore that the invention may be practiced otherwise than as specifically described without departing from the spirit and scope of the invention.

The embodiments of this invention in which an exclusive property or privilege is claimed are defined as follows:

1. A compound characterized by the structural formula

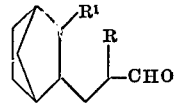

wherein $R^1$ represents hydrogen or methyl and R represents a lower alkyl group.

2. A compound as defined in claim 1 wherein R is methyl.

3. A compound as defined in claim 1 wherein R is ethyl.

4. A compound as defined in claim 1 wherein R is propyl.

5. A compound as defined in claim 4 wherein R is isopropyl.

6. A compound as defined in claim 1 wherein $R^1$ is hydrogen.

7. A compound as defined in claim 1 wherein $R^1$ is methyl.

8. A compound as defined in claim 1 which is 2-methyl-3-(2'norbornyl)-propanal.

9. A compound as defined in claim 1 which is 2-n-butyl-3-(2'-norbornyl)-propanal.

References Cited

UNITED STATES PATENTS

| | | | |
|---|---|---|---|
| 3,673,256 | 6/1972 | Pieper et al. | 260—598 |
| 3,662,008 | 5/1972 | Kretschmar et al. | 260—598 X |
| 3,673,261 | 6/1972 | Kretschmar et al. | 260—598 X |
| 3,679,756 | 7/1972 | Kretschmar et al. | 260—598 X |

FOREIGN PATENTS

| | | | |
|---|---|---|---|
| 1,381,663 | 11/1964 | France | 260—598 |

OTHER REFERENCES

West et al., Synthetic Perfumes (1949), 145.

BERNARD HELFIN, Primary Examiner

U.S. Cl. X.R.

252—522